(12) United States Patent
Choi (10) Patent No.: US 11,017,770 B2
(45) Date of Patent: May 25, 2021

(54) VEHICLE HAVING DIALOGUE SYSTEM AND CONTROL METHOD THEREOF

(71) Applicants: HYUNDAI MOTOR COMPANY, Seoul (KR); KIA MOTORS CORPORATION, Seoul (KR)

(72) Inventor: Seohwan Choi, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 204 days.

(21) Appl. No.: 16/411,670

(22) Filed: May 14, 2019

(65) Prior Publication Data
US 2020/0193983 A1  Jun. 18, 2020

(30) Foreign Application Priority Data
Dec. 13, 2018  (KR) .......... 10-2018-0161007

(51) Int. Cl.
| G10L 15/00 | (2013.01) |
| G10L 15/22 | (2006.01) |
| B60K 35/00 | (2006.01) |
| G10L 15/18 | (2013.01) |
| G06F 3/16  | (2006.01) |
| G10L 15/26 | (2006.01) |

(52) U.S. Cl.
CPC .......... G10L 15/22 (2013.01); B60K 35/00 (2013.01); G06F 3/167 (2013.01); G10L 15/1822 (2013.01); G10L 15/26 (2013.01); B60K 2370/148 (2019.05); G10L 2015/223 (2013.01)

(58) Field of Classification Search
None
See application file for complete search history.

(56) References Cited

U.S. PATENT DOCUMENTS

| 7,813,771 | B2* | 10/2010 | Escott | B60R 11/02 |
| | | | | 455/569.2 |
| 8,548,806 | B2* | 10/2013 | Nagashima | G10L 15/32 |
| | | | | 704/251 |
| 8,892,439 | B2* | 11/2014 | Odell | G10L 15/30 |
| | | | | 704/257 |
| 10,037,758 | B2* | 7/2018 | Jing | G10L 15/1815 |

(Continued)

OTHER PUBLICATIONS

Lin, Bor-shen, Hsin-min Wang, and Lin-shan Lee. "A distributed architecture for cooperative spoken dialogue agents with coherent dialogue state and history." (1999) (Year: 1999).*

(Continued)

*Primary Examiner* — Edgar X Guerra-Erazo
(74) *Attorney, Agent, or Firm* — Brinks Gilson & Lione (57) ABSTRACT

A vehicle may include: an input processor to receive a speech of a user and convert the speech into a text-type utterance; a natural language processor that performs morpheme analysis on the text-type utterance, and identifies an intent of the user and selects a domain related to the text-type utterance based on a result of the morpheme analysis; a storage to store a plurality of domains; a controller to add a new domain to the plurality of domains based on a specific condition, and determine a final domain among the plurality of domains and the added new domain; and a result processor to generate a command based on the determined final domain.

22 Claims, 7 Drawing Sheets

(56) References Cited

U.S. PATENT DOCUMENTS

| | | | |
|---|---|---|---|
| 2009/0271200 A1* | 10/2009 | Mishra | G01C 21/36 |
| | | | 704/254 |
| 2012/0253823 A1* | 10/2012 | Schalk | G08G 1/096877 |
| | | | 704/270.1 |
| 2017/0011742 A1* | 1/2017 | Jing | G10L 15/1815 |

OTHER PUBLICATIONS

M. Sun, A. Pappu, Y. Chen and A. I. Rudnicky, "Weakly supervised user intent detection for multi-domain dialogues," 2016 IEEE Spoken Language Technology Workshop (SLT), San Diego, CA, 2016, pp. 91-97. (Year: 2016).*

* cited by examiner

VEHICLE HAVING DIALOGUE SYSTEM AND CONTROL METHOD THEREOF

CROSS-REFERENCE TO RELATED APPLICATION

This application claims priority to and the benefit of Korean Patent Application No. 10-2018-0161007, filed on Dec. 13, 2018, the entire contents of which are incorporated herein by reference.

FIELD

The present disclosure relates to a vehicle having a dialogue system and a control method thereof, and more particularly, to a vehicle having a dialogue system for rapidly and accurately recognizing a user's utterance and a control method thereof.

BACKGROUND

The statements in this section merely provide background information related to the present disclosure and may not constitute prior art.

As technologies applied to vehicles are variously developed, not only driving feature, which is fundamental to a vehicle, but also user convenience functions are provided.

With the diversification of the features performed by a vehicle, there is an increasing burden on the user's manipulation, which distracts a driver from driving and hinders safe driving. In addition, a user who is inexperienced in device manipulation may have difficulty in properly utilizing the features performable by the vehicle.

In order to address the above-mentioned problems, vehicles have started to adapt speech recognition technologies, and various studies have been conducted to improve function of recognizing a user's utterance and provide better services.

SUMMARY

The present disclosure provides a vehicle having a dialogue system for rapidly and accurately recognizing a user's utterance, and a control method thereof.

Additional aspects of the present disclosure will be set forth in part in the description which follows and, in part, will be obvious from the description, or may be learned by practice of the present disclosure.

In an aspect of the present disclosure, a vehicle may include: an input processor configured to receive a speech of a user and convert the received speech into a text-type utterance; a natural language processor configured to perform morpheme analysis on the text-type utterance, and identify an intent of the user and select a domain related to the text-type utterance based on a result of the morpheme analysis; a storage configured to store a plurality of domains; a controller configured to add a new domain to the plurality of domains, and determine a final domain among the plurality of domains and the added new domain; and a result processor configured to generate a command on the basis of the determined final domain.

The controller is configured to add the new domain based on an adding condition including a period time and a number of searches with the converted text-type utterance, and to select the new domain when searched more than a predetermined number of times with the converted text-type utterance during the period time.

The controller is configured to delete the new domain upon sensing that a condition to keep the new domain is relieved.

The specific condition is configured to add the new domain when a location of the vehicle is within a predetermined area.

The new domain includes a keyword frequently searched more than a predetermined number of times within the predetermined area.

The controller is configured to add the new domain based on a certain time zone, and when the new domain is searched more than a certain number of times during the certain time zone.

The controller may cluster at least one keyword that is used by the user more than a predetermined number of times into an event domain, and the storage may store the event domain.

The controller, upon sensing turn-on of ignition of the vehicle, may determine the domain such that the event domain is prioritized over the plurality of domains.

The controller, when the destination of the vehicle is input to a navigation system of the vehicle, may determine the final domain such that the new domain related to information about a road to be travelled and information about the destination is prioritized over the event domain.

The controller, upon elapse of a certain time period, may determine the final domain such that a new domain related to an event corresponding to a date is prioritized over the event domain, on the basis of information about the date.

The vehicle may further include a communicator that provides the new domain by communicating with an external server when a domain corresponding to the intent of the user is not found.

In another aspect of the present disclosure, a method of controlling a dialogue system may include: receiving, by an input processor, a speech of a user and converting the received speech into a text-type utterance; performing, by a natural language processor, morpheme analysis on the text-type utterance, and identifying an intent of the user and selecting a domain corresponding to the intent of the user based on a result of the morpheme analysis; adding, by a controller, a new domain to a plurality of pre-stored domains, and determining a final domain among pre-stored domains of the plurality of pre-stored domains and the added new domain; and generating, by a result processor, a command on the basis of the determined final domain.

The determining of the domain corresponding to the intent of the user from the new domain may include: selecting the new domain when the text-type utterance is searched more than a predetermined number of times during a predetermined period of time.

The determining of the final domain may include: deleting the new domain upon sensing that a condition to keep the new domain is relieved.

The determining of the final domain may include: adding the new domain to the plurality of pre-stored domains when a location of a vehicle is within a predetermined area.

The determining of the final domain may include: selecting the new domain including a keyword frequently searched more than a predetermined number of times within the predetermined area.

The determining of the final domain may include: selecting the new domain that is searched more than a certain number of times during the certain time zone.

The determining of the final domain may include: clustering at least one keyword that is used by the user more than a predetermined number of times into an event domain, and storing the event domain.

The determining of the final domain may include: determining the final domain such that the event domain is prioritized over the plurality of pre-stored domains upon sensing turn-on of ignition of the vehicle.

The determining of the final domain may include: determining the final domain such that the new domain related to information about a road to be travelled and information about a destination is prioritized over the event domain, when the destination is input to a navigation system of the vehicle.

The determining of the final domain may include: upon elapse of a certain time period, determining the final domain such that the new domain related to an event corresponding to a date is prioritized over the event domain, on the basis of information about the date.

The method may further include: providing the new domain by communicating with an external server when the domain corresponding to an intent of the user is not found.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Not all elements of forms of the present disclosure will be described, and description of what are commonly known in the art or what overlap each other in the forms will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a layer is "on" another layer or substrate, the layer may be directly on another layer or substrate or a third layer may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and forms of the disclosure will be described with reference to the accompanying drawings.

Figure 1:
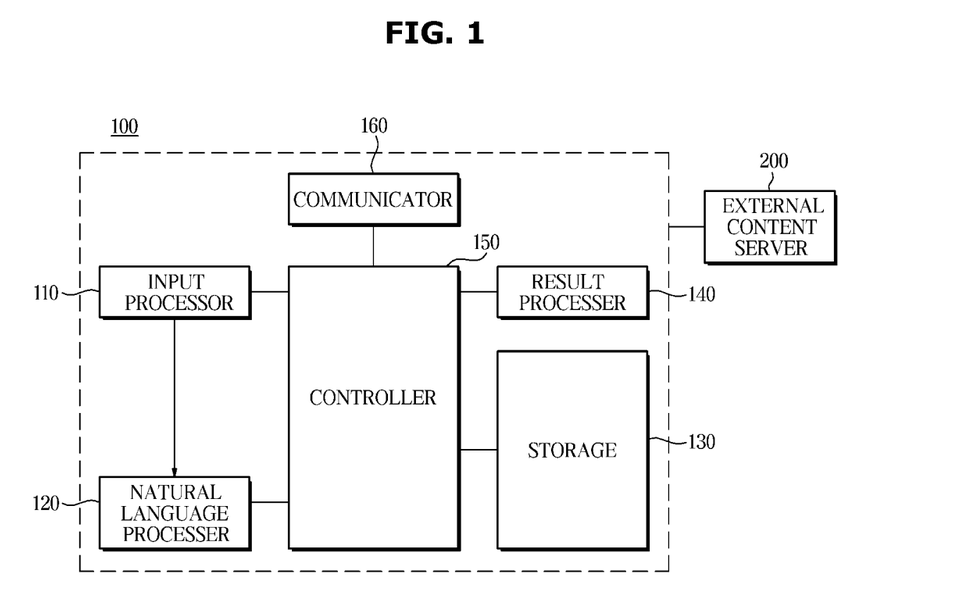
FIG. 1 is a control block diagram illustrating a dialogue system in one form.

FIG. 1 is a control block diagram illustrating a dialogue system 100 according to one form of the present disclosure.

The dialogue system 100 is an apparatus for identifying a user's intent using a user's speech and non-speech input and for providing a service suitable for the user's intent or a service required for the user, and the dialogue system 100 performs a dialogue with the user by outputting a system utterance to provide a service or clearly identify the user's intent.

In one form, the service provided to the user includes all operations performed to satisfy the user's demands or intents, such as providing information, controlling the vehicle, executing audio/video/navigation functions, providing contents received from an external service, and the like.

In addition, the dialogue system 100 may provide a dialogue processing technique for a vehicle environment, thereby accurately identifying the intent of a user in an environment of the vehicle. Accordingly, the dialogue system 100 may be provided in a vehicle, to receive speech and non-speech input information from a user, and provide a result corresponding thereto.

A gateway connecting the dialogue system 100 to the user may be a vehicle or a mobile device connected to the vehicle. As will be described below, the dialogue system 100 may be provided in a vehicle, or may be provided in a remote server outside a vehicle, and may exchange data through communication with the vehicle or a mobile device connected to the vehicle.

In addition, some components of the dialogue system 100 may be provided in the vehicle and some other components may be provided in the remote server such that the operations of the dialogue system 100 may be respectively performed by the vehicle and the remote server. Hereinafter, the components and operations of the dialogue system 100 will be described in detail.

The dialogue system 100 includes an input processor 110, a natural language processer 120, a storage 130, a result processer 140, a controller 150, a communicator 160, and an external content server 200.

The input processor 110 may receive two types of input, that is, a speech of a user and a non-speech input. The non-speech input includes recognition of a user's gesture, a non-speech input of a user input through manipulation of an input device, vehicle state information indicating the state of the vehicle, driving environment information related to the driving environment of the vehicle, user information indicating the state of the user, and the like. In addition to the above described information, all types of information related to the vehicle and the user may be received as an input to the input processor 110 as long as the information is used to identify the user's intent or provide a service to the user. The user may include both the driver and the passenger.

The input processor 110 recognizes the inputted user's speech and converts the user's speech into a text-type utterance.

In addition, the input processor 110 may collect information related to the state of the vehicle and the driving environment, in addition to the user's speech.

The input processor 110 transmits information related to a user's intent and situation to the natural language processor 120 to perform natural language processing on the text-type utterance.

The natural language processor 120 may identify a user's intent contained in the utterance using a natural language understanding technique. Accordingly, the user may input a command through a natural dialogue, and the dialogue system 100 may also induce input of a command through a dialogue or provide a service required by the user.

The natural language processor 120 performs morpheme analysis on the text-type utterance. A morpheme is the smallest unit having a meaning, representing the smallest semantic element that may no longer be subdivided. Accordingly, morpheme analysis is the first step in the natural language understanding, in which an input character string is converted into a morpheme string.

The natural language processor 120 extracts a domain from the utterance (i.e., the text-type utterance) on the basis of the morpheme analysis result. A domain is provided to identify a subject of a language uttered by a user. For example, the domains may be provided as a database representing various subjects, such as sports, route guidance, weather search, traffic search, and schedule management.

The natural language processor 120 may recognize an entity name from the utterance. An entity name is a proper name, such as a personal name, a place name, an organization name, a time, a date, a currency, and the like, and an entity name recognition is an operation of distinguishing an entity name in a sentence and determining the type of the distinguished entity name. The entity name recognition allows an important keyword to be extracted from the sentence, so that the meaning of the sentence is identified.

The natural language processor 120 may analyze a speech act of the utterance. The speech act analysis is an operation of analyzing the intent of the user utterance, to identify the intent of the utterance whether the user is asking a question, asking a request, responding, or simply expressing an emotion.

The natural language processor 120 extracts an action corresponding to the intent of a user's utterance. The natural language processor 120 identifies the intent of the user's utterance on the basis of information such as a domain, an entity name, and a speech act corresponding to the utterance, and extracts an action corresponding to the intent of the utterance. The action may be defined by an object and an operator.

The natural language processor 120 may extract arguments related to execution of the action. The argument related to the action execution may be a valid argument directly required for executing the action or an invalid argument used to extract the valid argument.

The natural language processor 120 may extract a device for expressing the modification relation between words or sentences, such as a parse-tree. In addition, the result of the natural language processing, such as morpheme analysis result, domain information, action information, speech act information, extracted argument information, entity name information, parse tree, and the like, are transmitted to the controller 150.

The storage 130 stores various types of data desired for the dialogue system 100 to utter a dialogue. For example, information related to a domain, an action, a speech act, and an entity name, used for natural language understanding, may be previously stored in the storage 130.

The storage 130 stores a plurality of domains in which various pieces of information for providing contents to users by the dialogue system 100 are grouped according to subjects. For example, domains are formed into a database that represents various subjects, such as sports, route guidance, weather search, traffic search, and schedule management.

The result processor 140 may determine the mode of serving the user on the basis of a command determined by the controller 150. The servicing mode represents a mode of making a preliminary utterance or a mode of asking a question by the dialogue system 100.

The result processor 140 generates and outputs a dialogue response and a command desired to perform the transmitted action. The dialogue response may be output as text, image, or audio, and when the command is output, services such as vehicle control, external content service, and the like corresponding to the output command may be performed.

Meanwhile, the existing dialog system generates a plurality of domains in a random order and provides the domains to users. Accordingly, as the types of domains stored in the storage 130 are diversified, the speech recognition rate decreases. However, the disclosure does not search all of the plurality of domains, and delimits the search target from all the domains to a new domain.

As described above, the greater the number of domains stored in the storage 130, the lower the speech recognition rate of the dialogue system. Accordingly, the controller 150 may delimit the number of domains, which are selectable to select a single domain, to a range of new domains among a plurality of domains stored in the storage 130. Here, the controller 150 may use a specific condition to determine the range of the selectable domains, and details thereof will be described below.

The controller 150 selects only the domain that satisfies the specific condition. The controller 150, in response to a presence of domain information previously stored in the storage 130, outputs the stored domain, and when the specific condition is not satisfied, receives a relevant service domain through information transmission/reception with the external content server 200 and outputs the received service domain.

The communicator 160 may include one or more components that enable the dialogue system 100 to communicate with a subsidiary device, as a path through which the dialogue system 100 collects contextual information and various other types of data. For example, the communicator 160 may include at least one of a short-range communication module, a wired communication module, or a wireless communication module.

The short-range communication module may include various short range communication modules for transmitting and receiving signals using a wireless communication network in a short range, for example, a Bluetooth module, an infrared communication module, an Radio Frequency Identification (RFID) communication module, a Wireless Local Access Network (WLAN) communication module, an NFC communication module, a Zigbee communication module, and the like.

The wired communication module may include various wired communication modules, such as a controller area network (CAN) communication module, a local area network (LAN) module, a wide area network (WAN) module, or a value added network (VAN) module, and various cable communication modules, and also various cable communication modules, such as universal serial bus (USB), high definition multimedia interface (HDMI), and digital visual interface (DVI), recommended standard 232 (RS-232), power line communication, or plain old telephone service (POTS).

The wireless communication module may include a WiFi module, a wireless broadband (WIBRO) module, a global system for mobile (GSM) communication module, a code division multiple access (CDMA) module, a wideband code division multiple access (WCDMA) module, a universal mobile telecommunications system (UMTS), a time division multiple access (TDMA) module, a long term evolution (LTE) module, and other wireless communication modules that support various wireless communication methods.

Meanwhile, the communicator 160 may include various components and modules capable of collecting information from the outside in addition to the above-described configuration. In addition, the communicator 160 may update the user's preference, vehicle control history, and the like stored in the storage 130 on the basis of the vehicle control and the external content request corresponding to the generated and outputted command.

The described input processor 110, the natural language processor 120, the storage 130, the result processor 140, and the controller 150 as described above may include a memory (not shown) for storing data regarding an algorithm for controlling the operations of the components of the dialogue system 100 or a program that represents the algorithm, and a processor (not shown) that performs the above described operations using the data stored in the memory. At this time, the memory and the processor may be implemented as separate chips. Alternatively, the memory and the processor may be implemented as a single chip.

Figure 2:
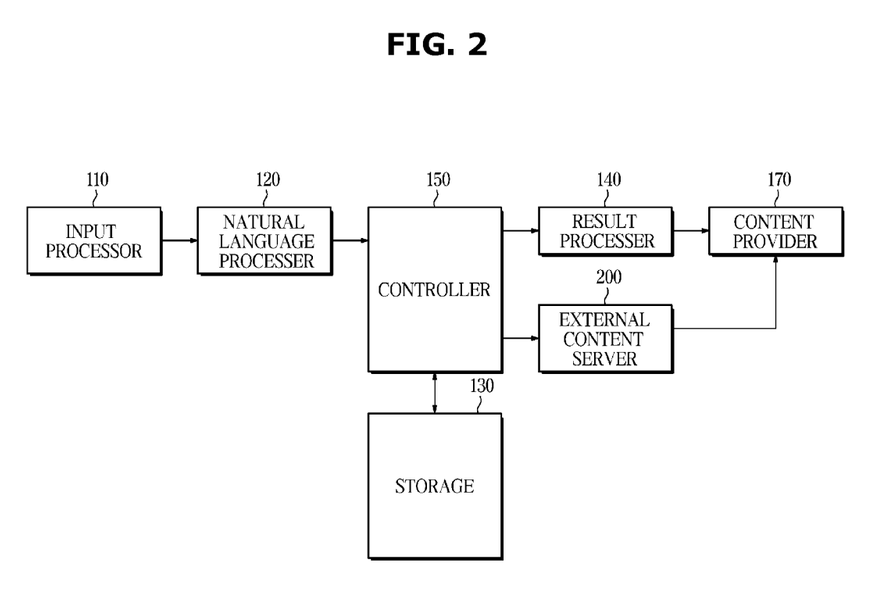
FIG. 2 is a control block diagram illustrating a dialogue system in another form.

FIG. 2 is a control block diagram illustrating a dialogue system 100 according to another form of the present disclosure. The dialogue system 100 includes an input processor 110, a natural language processor 120, a storage 130, a result processor 140, a controller 150, a content provider 170, and an external content server 200.

The input processor 110, the natural language processor 120, the storage 130, the result processor 140, and the controller 150 have been described already with reference to FIG. 1.

The dialogue system 100 shown in FIG. 2 may use a plurality of domains stored in the storage 130 and an external domain obtained from the external content server 200 through web-search, to provide the user with services corresponding to a command, such as vehicle control, external content service, and the like.

The content provider 170 may generate a command on the basis of a domain obtained from the storage 130 and the external content server 200 and perform control corresponding to the generated command, to thereby provide a service required by the user.

Figure 3:
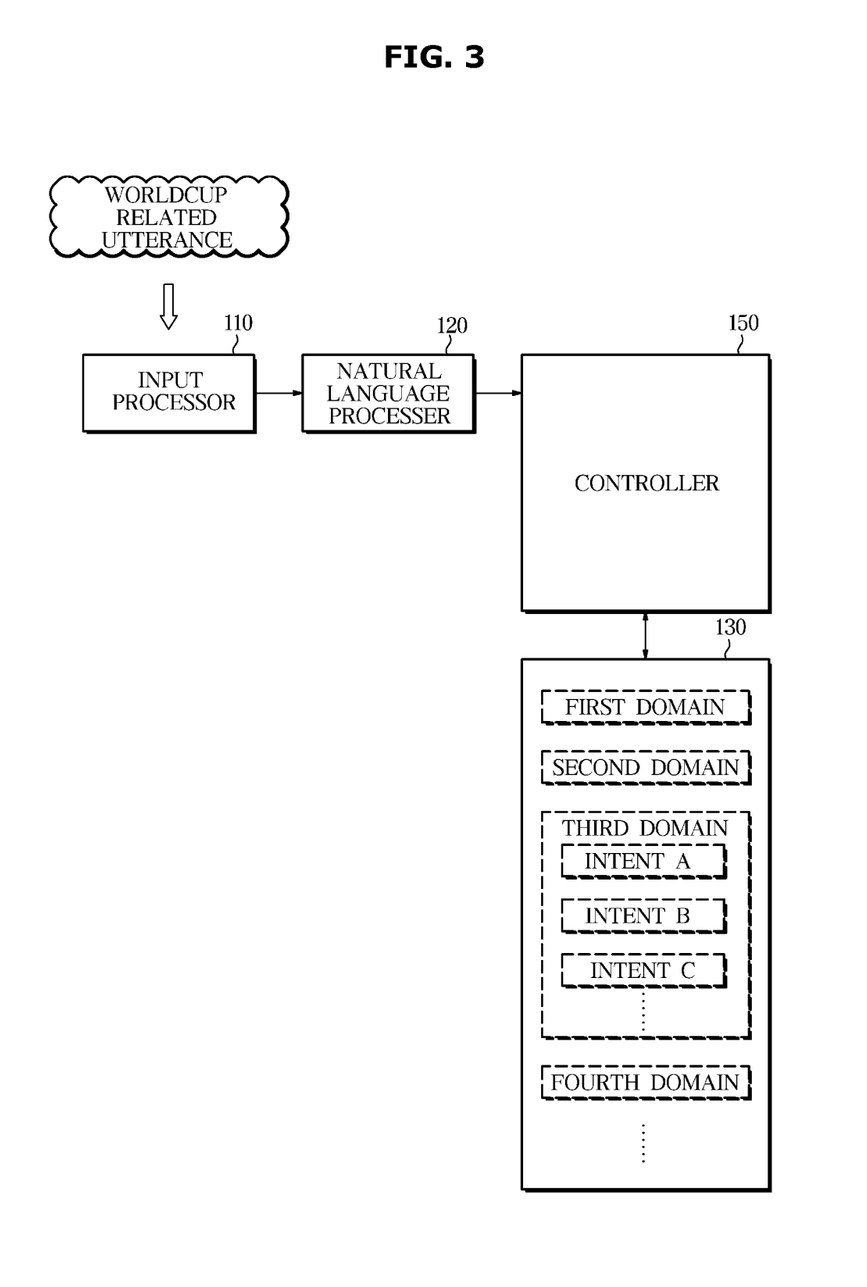
FIGS. 3 and 4 are views for describing one form of a dialog processing.
Figure 4:
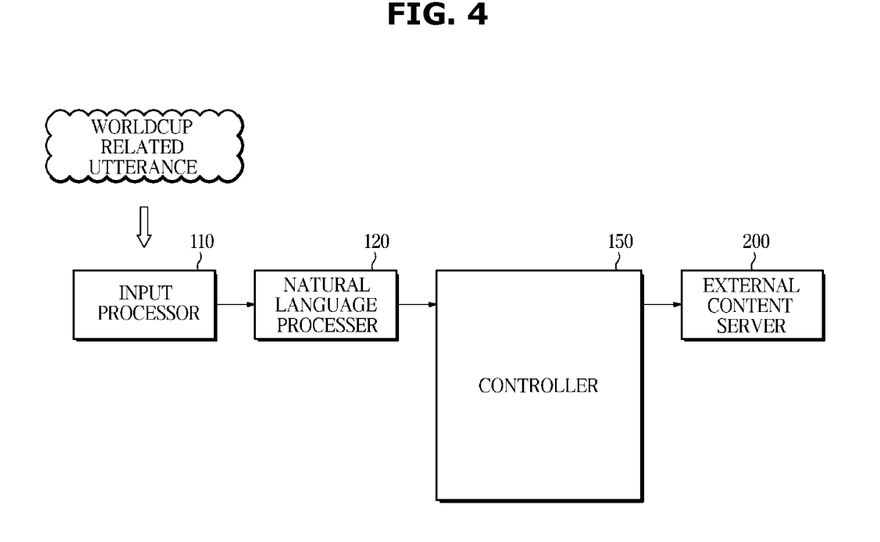

FIGS. 3 and 4 are views for describing one form of a dialog processing.

According to the form, the storage 130 is associated with a domain which is expected to be searched a large number of times during a specific period, so that the processing time for the web search may be saved.

For example, when the specific period is the World Cup season, the controller 150 may newly add a World Cup domain and arrange the World Cup domain with a priority so that the World Cup domain may be directly immediately selected from the storage 130. FIG. 3 shows a case where the specific period is the World Cup season, and FIG. 4 shows a case when the specific period corresponding to the World Cup season has passed. Referring to FIGS. 3 and 4, during the World Cup season, the controller 150 may select a domain (a third domain) related to the World Cup among first to fourth domains stored in the storage 130 without performing a separate web search. When the World Cup period has passed, the controller 150 may control the domain search to be performed through the external content server 200 rather than through the storage 130.

According to another example, when the specific period is a period from July to August, domains related to summer resort, rainy season, typhoon, and weather information may be arranged with a priority.

In one form, the controller 150 may add and select a new domain to a plurality of domains according to a specific condition. In this case, the specific condition may be a certain period and the number of searches. For example, when a domain related to the World Cup is searched more than a certain number of times during the World Cup season, the controller 150 may add a new domain to a plurality of domains and determine the new domain such that the domain related to the World Cup is selected without a need to communicate with an external server. In other words, a domain may be assigned a period attribute to operate only at a specific time point in time such that the domain is prioritized during the set period, and is excluded during other periods, so that the recognition rate of the domain may be improved.

As a modified example, the specific condition may be the location of a vehicle. According to an exemplary form, when the vehicle is within a predetermined area, the controller 150 may delimit selectable domains. For example, when the location of the vehicle is sensed to be an area around an airport, the selectable domain may be delimited to a domain related to a duty-free shop that is highly relevant to the airport. In addition, the controller 150 may add and determine a new domain including a keyword frequently searched in a predetermined area.

In addition, the specific condition may be a certain time slot. For example, the controller 150 may add a new domain that is searched more than a certain number of times during a certain time slot, and assigns the new domain with a priority.

The added new domain may be deleted when the above-mentioned specific condition is relieved. For example, when the World Cup season has passed, the World Cup domain may be deleted from the storage. In addition, when the specific condition is the location of a vehicle, the newly added new domain may be controlled to be deleted from the storage when the vehicle departs from the predetermined area.

Figure 5:
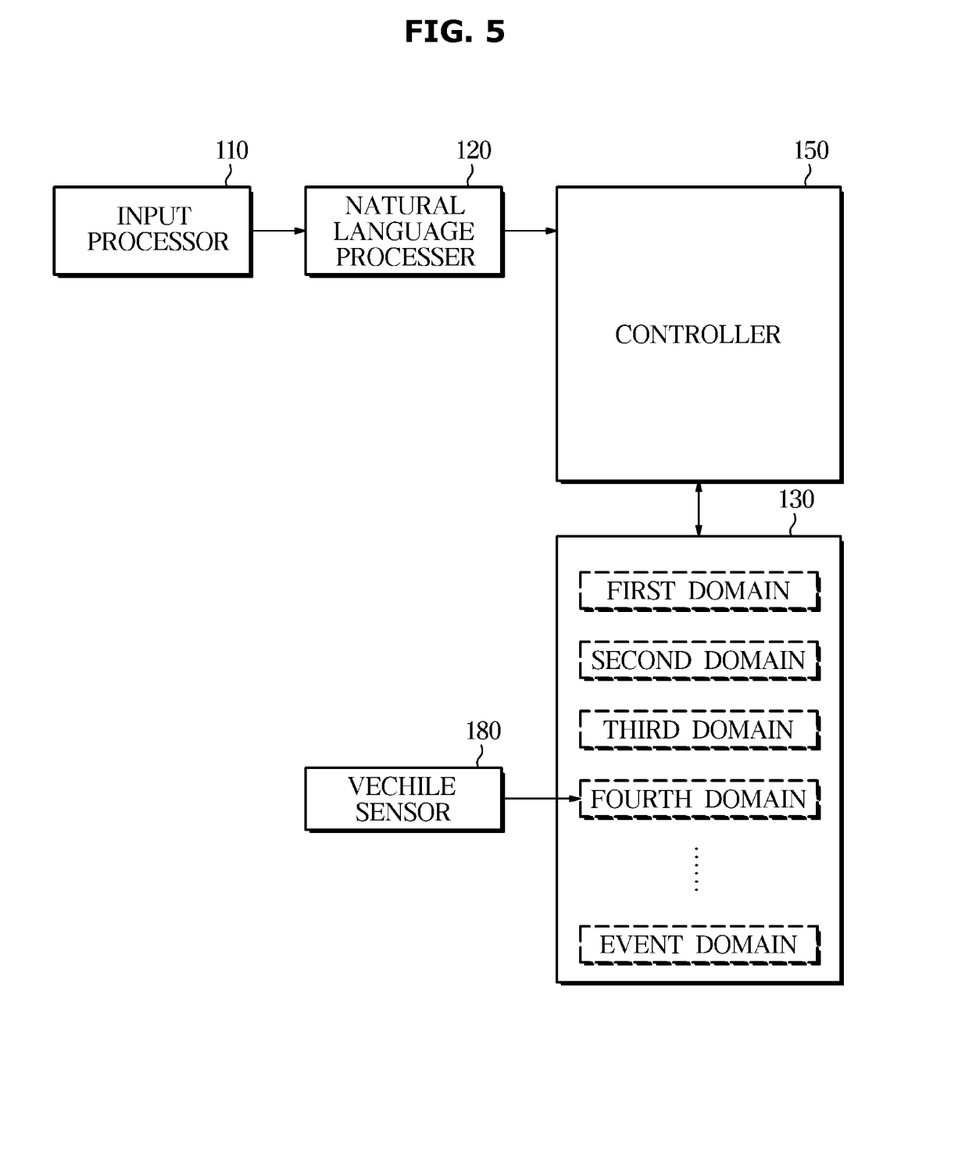
FIGS. 5 and 6 are views for describing another form of a dialog processing.
Figure 6:
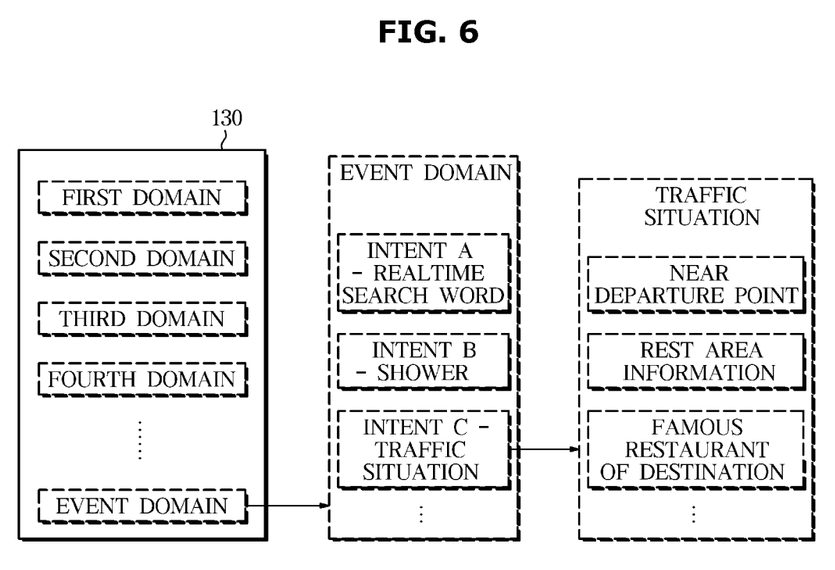

FIGS. 5 and 6 are views for describing another form of a dialog processing. Before describing the present form, a vehicle sensor 180, which is added to the present form, will be described.

The vehicle sensor 180 may sense an ignition state of the vehicle. In detail, the vehicle sensor 180 may sense an electronic parking brake (EPB) release signal and a vehicle ignition starting signal to sense an ignition state of the vehicle. In this case, the vehicle sensor 180 may senses the state of the vehicle and transmit the result of the sensing to the controller 150.

The controller 150 clusters a new domain including a keyword used by the user more than a certain number of times into an event domain, and the storage 130 stores the clustered domain as an event domain. A plurality of keywords having a similarity insufficient for constituting a single domain are included into an event domain, and a quick response may be induced according to a point in time of a user's utterance. For example, the event domain may be "Hanam bridge accident situation", "Real-time search word", "Current rainfall area" and so on.

Meanwhile, the vehicle sensor 180 senses turn-on of ignition of the vehicle, and in response to the turn-on of ignition of the vehicle, assigns the event domain with a priority over the plurality of domains stored in the storage 130. In addition, when ignition of the vehicle is turned on and a destination is input to a navigation system provided in the vehicle, the controller 150 may control a new domain, which is related to information about a road to be travelled based on the destination and information about the destination, to be prioritized over the event domain. Furthermore, when a certain period has elapsed, the controller 150 may control a new domain related to an event corresponding to a date to be prioritized over the event domain on the basis of information about the date.

For example, after twenty minutes since the start of the vehicle, the controller 150 may control domains related to traffic situation, oil price information, and rest area information to be prioritized over the event domain, and when 20 minutes are left before arrival at the destination, control domains related to a restaurant around the destination to be prioritized over the event domain.

Figure 7:
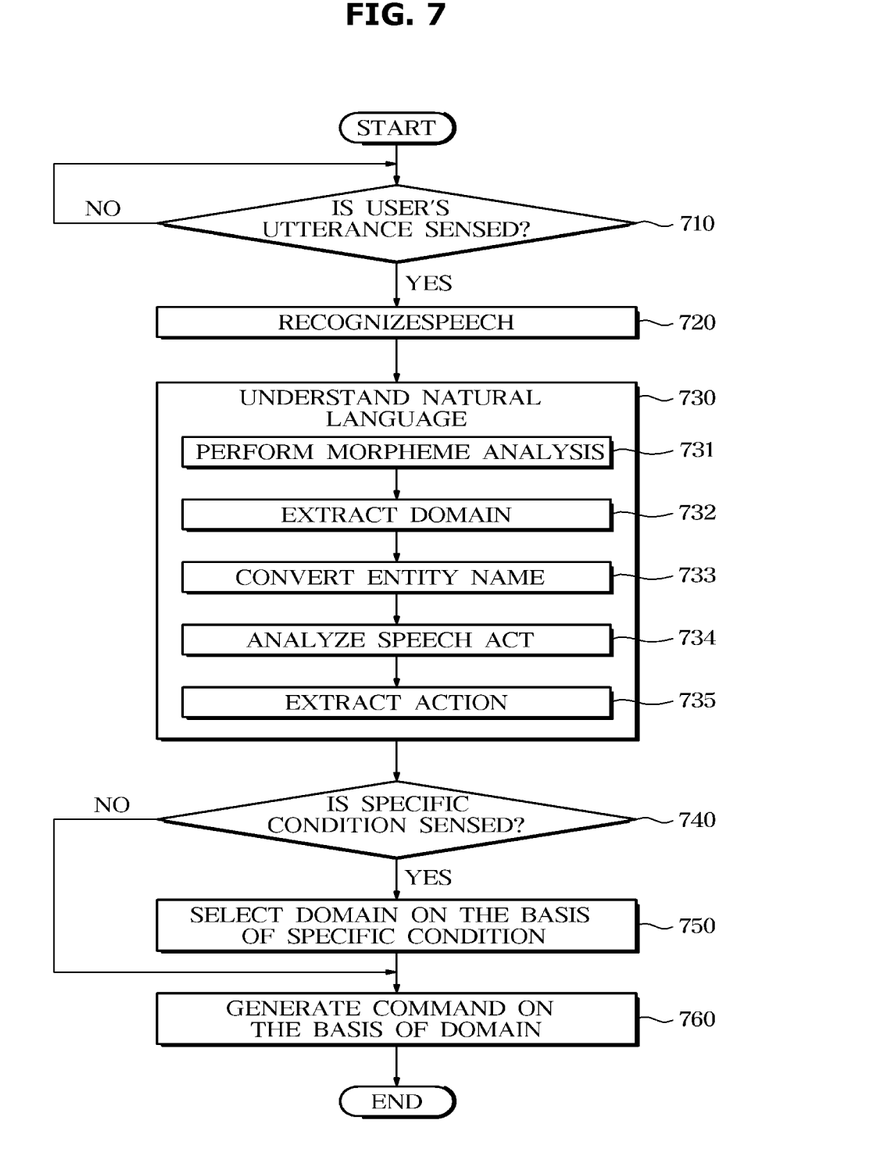
FIG. 7 is a flowchart showing a method of controlling a vehicle provided with a dialogue system.

FIG. 7 is a flowchart showing a method of controlling a vehicle provided with a dialog system 100 according to one form of the present disclosure. However, this is merely exemplary and it should be understood that some of the operations may be added or omitted if desired.

Upon sensing a user's utterance (710), the input processor recognizes a user's speech (720) and outputs the user's utterance as a text-type utterance. The output text-type utterance is transmitted to the natural language processor, and is subjected to natural language understanding technique, and the result is outputted In detail, a natural language understanding process (730) includes performing morpheme analysis (731) on a text-type utterance, extracting a domain on the basis of the morpheme analysis result (732), recognizing an entity name (733), analyzing a speech act (734), and extracting an action (735).

An inference rule stored in the storage may be referred to for the domain extraction, entity name recognition, and action extraction. The output of the natural language processor, that is, the natural language understanding result may include a domain, an action, a speech act, and a morpheme analysis result corresponding to the utterance of the user.

Meanwhile, the controller senses a specific condition (740), and selects at least one domain for generating a command from a plurality of domains on the basis of the specific condition (750).

The controller generates a command for vehicle control or external content utilization on the basis of the selected domain (760).

Meanwhile, the disclosed forms may be embodied in the form of a recording medium storing instructions executable by a computer. The instructions may be stored in the form of program code and, when executed by a processor, may generate a program module to perform the operations of the disclosed forms. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, a content is provided from a small number of domains that have a high relevance so that the processing time of the dialogue system can be shortened.

Although exemplary forms have been described with reference to the accompanying drawings, those skilled in the art will appreciate that these inventive concepts may be embodied in different forms without departing from the scope and spirit of the disclosure, and should not be construed as limited to the forms set forth herein. The disclosed forms have been described for illustrative purposes and not for limiting purposes.

What is claimed is:

1. A vehicle comprising:
an input processor configured to receive a speech of a user and convert the received speech into a text-type utterance;
a natural language processor configured to:
perform morpheme analysis on the text-type utterance,
identify an intent of the user, and
select a domain related to the text-type utterance based on a result of the morpheme analysis;
a storage configured to store a plurality of domains;
a controller configured to add a new domain to the plurality of domains, and to determine a final domain among domains of the plurality of domains and the added new domain; and
a result processor configured to generate a command based on the determined final domain.

2. The vehicle of claim 1, wherein the controller is configured to add the new domain based on an adding condition including a period time and the number of searches, and to select the new domain when searched more than a predetermined number of times during the period time.

3. The vehicle of claim 1, wherein the controller is configured to delete the new domain upon sensing that a condition to keep the new domain is relieved.

4. The vehicle of claim 1, wherein the controller is configured to add the new domain when a location of the vehicle is within a predetermined area.

5. The vehicle of claim 4, wherein the new domain includes a keyword frequently searched more than a predetermined number of times within the predetermined area.

6. The vehicle of claim 1, wherein the controller is configured to add the new domain based on a certain time zone, and when the new domain is searched more than a certain number of times during the certain time zone.

7. The vehicle of claim 1, wherein the controller is configured to cluster at least one keyword that is used by the user more than a predetermined number of times into an event domain, and the storage is configured to store the event domain.

8. The vehicle of claim 7, wherein the controller, upon sensing turn-on of ignition of the vehicle, is configured to determine the domain such that the event domain is prioritized over the plurality of domains.

9. The vehicle of claim 7, wherein the controller, when a destination of the vehicle is input to a navigation system of the vehicle, is configured to determine the final domain such that the new domain related to information about a road to be travelled and information about the destination is prioritized over the event domain.

10. The vehicle of claim 7, wherein the controller, upon elapse of a period time, is configured to determine the final domain such that a new domain related to an event corresponding to a date is prioritized over the event domain, based on information about the date.

11. The vehicle of claim 1, further comprising a communicator configured to provide the new domain by communicating with an external server when a domain corresponding to the intent of the user is not found.

12. A method of controlling a dialogue system, the method comprising:

receiving, by an input processor, a speech of a user and converting the received speech into a text-type utterance;

performing, by a natural language processor, morpheme analysis on the text-type utterance, and identifying an intent of the user and determining a domain corresponding to the intent of the user based on a result of the morpheme analysis;

adding, by a controller, a new domain to a plurality of pre-stored domains, and determining a final domain among pre-stored domains of the plurality of pre-stored domains and the added new domain; and generating, by a result processor, a command based on the determined final domain.

13. The method of claim 12, wherein determining the domain corresponding to the intent of the user includes:

selecting the new domain when the text-type utterance is searched more than a predetermined number of times during a predetermined period of time.

14. The method of claim 12, wherein determining the final domain includes:

deleting the new domain upon sensing that a condition to keep the new domain is relieved.

15. The method of claim 12, wherein determining the final domain includes:

adding the new domain to the plurality of pre-stored domains when a location of a vehicle is within a predetermined area.

16. The method of claim 13, wherein determining the final domain includes:

selecting the new domain including a keyword frequently searched more than a predetermined number of times within the predetermined area.

17. The method of claim 12, wherein determining of the final domain includes:

selecting the new domain that is searched more than a certain number of times during a certain time zone.

18. The method of claim 12, wherein determining the final domain includes:

clustering at least one keyword that is used by the user more than a predetermined number of times into an event domain, and storing the event domain.

19. The method of claim 18, wherein determining the final domain corresponding to the intent of the user includes:

determining the final domain such that the event domain is prioritized over the plurality of pre-stored domains upon sensing turn-on of ignition of a vehicle.

20. The method of claim 18, wherein determining the final domain includes:

determining the final domain such that the new domain related to information about a road to be travelled and information about a destination is prioritized over the event domain, when the destination is input to a navigation system of a vehicle.

21. The method of claim 18, wherein determining the final domain includes:

upon elapse of a period time, determining the final domain such that the new domain related to an event corresponding to a date is prioritized over the event domain, based on information about the date.

22. The method of claim 12, further comprising:

providing, by a communicator, the new domain by communicating with an external server when the domain corresponding to the intent of the user is not found.

* * * * *